United States Patent [19]

Grandjean et al.

[11] Patent Number: 4,514,676

[45] Date of Patent: Apr. 30, 1985

[54] METHOD AND DEVICE FOR CONTROLLING A BIDIRECTIONAL STEPPING MOTOR

[75] Inventors: Rémy Grandjean, Fontainemelon; Yves Guérin, Granges, both of Switzerland

[73] Assignee: ETA S.A., Fabriques d'Ebauches, Granges, Switzerland

[21] Appl. No.: 466,392

[22] Filed: Feb. 14, 1983

[30] Foreign Application Priority Data

Feb. 15, 1982 [CH] Switzerland .......................... 918/82

[51] Int. Cl.$^{3}$ ............................................ H02K 29/04

[52] U.S. Cl. .................................... 318/696; 368/157; 318/685

[58] Field of Search ................ 318/696, 685; 368/156, 368/157

[56] References Cited

FOREIGN PATENT DOCUMENTS

| | | |
|---|---|---|
| 030611 | 6/1981 | European Pat. Off. . |
| 3026004 | 1/1981 | Fed. Rep. of Germany . |
| 917236 | 1/1963 | United Kingdom . |
| 1451359 | 9/1976 | United Kingdom . |
| 81WO/01205 | 4/1981 | PCT Int'l. Appl. . |
| 81WO/02207 | 8/1981 | PCT Int'l. Appl. . |

*Primary Examiner*—B. Dobeck
*Assistant Examiner*—Saul M. Bergmann
*Attorney, Agent, or Firm*—Pollock, Vande Sande & Priddy

[57] ABSTRACT

The invention concerns a method for controlling a bidirectional stepping motor having two windings and three pole faces.

The invention comprises applying current pulses alternately to only one of the motor windings to cause it to rotate in one direction and to only the other of the motor windings to cause it to rotate in the other direction.

The invention is used for controlling bidirectional motors which are employed in particular in timepieces.

16 Claims, 22 Drawing Figures

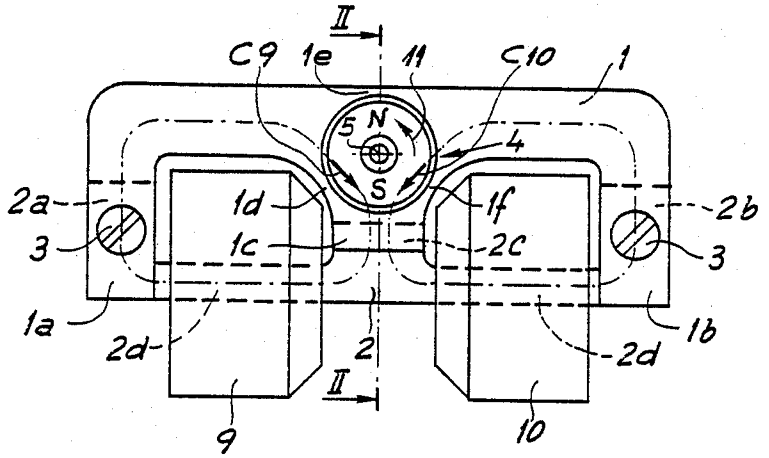
Fig.1
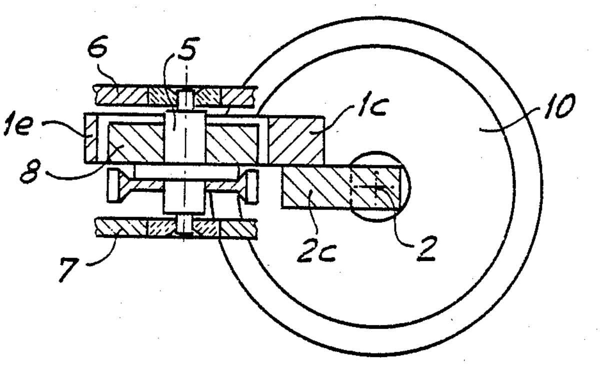
Fig.2
| | I9 | I10 | C9 | C10 | Ra | Rb | Rc |
|---|---|---|---|---|---|---|---|
| A | | +1 | | ↙ | ↑ | ↙ | ↓ |
| B | | −1 | | ↗ | ↓ | ↗ | ↑ |
| C | +2 | | ↘ | | ↑ | ↘ | ↓ |
| D | −2 | | ↖ | | ↓ | ↖ | ↑ |
Fig.3
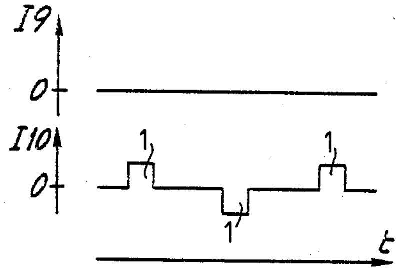
Fig.4a
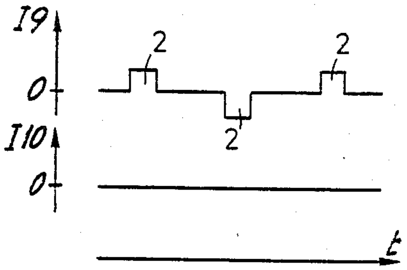
Fig.4b

| | I9 | I10 | C9 | C10 | Ra | Rb1 | Rb2 | Rc |
|---|---|---|---|---|---|---|---|---|
| A1 | | $+^{1}$ | | ↙ | ↑ | ↙ | | |
| A2 | $+^{3}$ | | ↘ | | | | ↘ | ↓ |
| B1 | | $-^{1}$ | | ↗ | ↓ | ↗ | | |
| B2 | $-^{3}$ | | ↖ | | | | ↖ | ↑ |
| C1 | $+^{2}$ | | ↘ | | ↑ | ↘ | | |
| C2 | | $+^{4}$ | | ↙ | | | ↙ | ↓ |
| D1 | $-^{2}$ | | ↖ | | ↓ | ↖ | | |
| D2 | | $-^{4}$ | | ↗ | | | ↗ | ↑ |

| | I9 | I10 | C9 | C10 | Ra | Rb1 | Rb2 | Rc |
|---|---|---|---|---|---|---|---|---|
| A1 | $-^{1}$ | | ↖ | | ↑ | ↖ | | |
| A2 | | $+^{3}$ | | ↙ | | | ↙ | ↓ |
| B1 | $+^{1}$ | | ↘ | | ↓ | ↘ | | |
| B2 | | $-^{3}$ | | ↗ | | | ↗ | ↑ |
| C1 | | $-^{2}$ | | ↗ | ↑ | ↗ | | |
| C2 | $+^{4}$ | | ↘ | | | | ↘ | ↓ |
| D1 | | $+^{2}$ | | ↙ | ↓ | ↙ | | |
| D2 | $-^{4}$ | | ↖ | | | | ↖ | ↑ |
Fig. 10
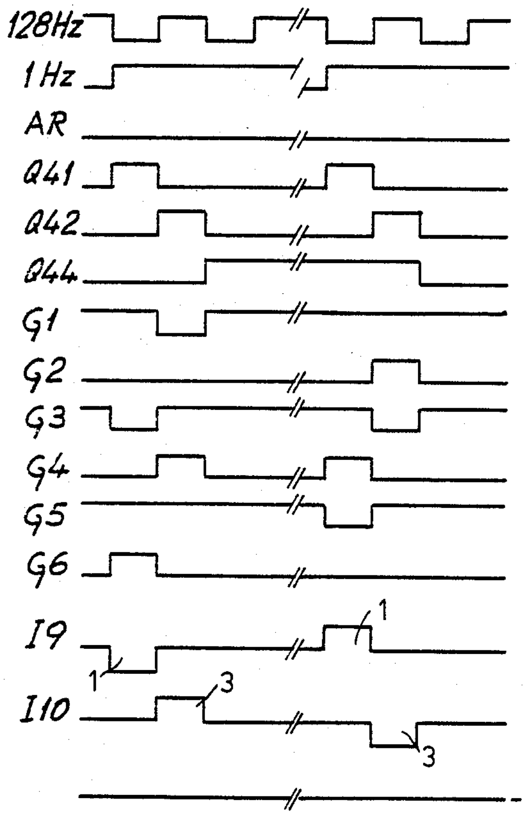
Fig. 12a
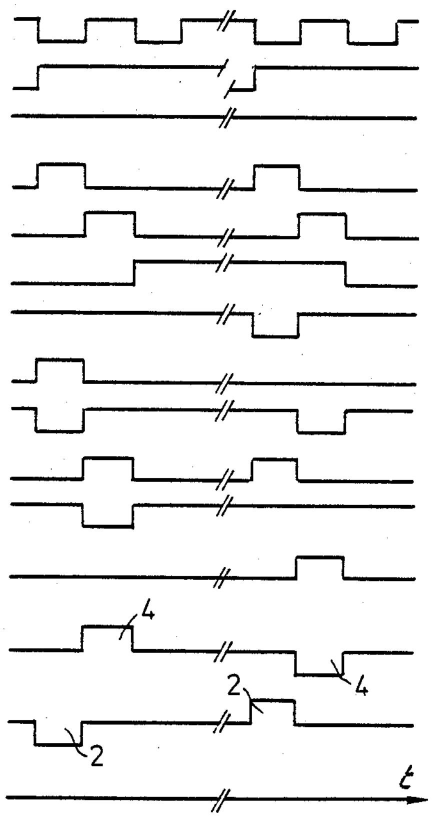
Fig. 12b

| | I9 | I10 | C9 | C10 | Ra | Rb1 | Rb2 | Rc |
|---|---|---|---|---|---|---|---|---|
| A1 | $-^{1}$ | | ↖ | | ↑ | ↖ | | |
| A2 | | $+^{3}$ | | ↙ | | | ↙ | |
| A3 | $+^{5}$ | $+^{1}$ | ↘ | ↙ | | | | ↓ |
| B1 | $+^{1}$ | | ↘ | | ↓ | ↘ | | |
| B2 | | $-^{3}$ | | ↗ | | | ↗ | |
| B3 | $-^{5}$ | $-^{1}$ | ↖ | ↗ | | | | ↑ |
| C1 | | $-^{2}$ | | ↗ | ↑ | ↗ | | |
| C2 | $+^{4}$ | | ↘ | | | | ↘ | |
| C3 | $+^{1}$ | $+^{6}$ | ↘ | ↙ | | | | ↓ |
| D1 | | $+^{2}$ | | ↙ | ↓ | ↙ | | |
| D2 | $-^{4}$ | | ↖ | | | | ↖ | |
| D3 | $-^{1}$ | $-^{6}$ | ↖ | ↗ | | | | ↑ |

Fig. 13

METHOD AND DEVICE FOR CONTROLLING A BIDIRECTIONAL STEPPING MOTOR

BACKGROUND OF THE INVENTION

The present invention relates to a method and device for controlling a bidirectional stepping motor including a stator comprising an armature which has first, second and third pole faces defining therebetween a substantially cylindrical space and which comprises first and second magnetic circuits respectively connecting the first pole face to the second pole face and the first pole face to the third pole face, the stator further comprising first and second windings which are magnetically coupled to the first and second magnetic circuits respectively, and the motor further including a rotor comprising a permanent magnet mounted rotatably in said space.

A motor as defined above is described in German patent application laid open as DE 30 26 004A. In accordance with that application, the motor is controlled by current pulses which are simultaneously applied to the two windings, whenever the rotor is to rotate through one step, that is to say, 180°. The polarity of the current flowing in one of the windings is reversed substantially at the middle of the drive pulse.

The level of power consumption of a motor which is actuated in the above-indicated manner is fairly substantial, since current flows simultaneously in the two windings. In addition, the fact that the polarity of the current in one of the windings has to change in the middle of the drive pulse means that the motor control circuit requires eight transistors which conventionally form two bridge assemblies of four transistors, each assembly being connected to one of the windings. The eight transistors which must carry a fairly strong current occupy a large surface area on the silicon chip in which all the components of the electronic circuit for producing the drive pulses are integrated.

SUMMARY OF THE INVENTION

The object of the present invention is to provide a method and device for controlling a motor as defined hereinbefore, which make it possible on the one hand to reduce the current consumption of the motor and on the other hand to use only six power transistors in the control circuit.

The object is achieved by the method and the device claimed.

BRIEF DESCRIPTION OF THE DRAWINGS

The invention will now be described in more detail, by way of example, with reference to the accompanying drawings, in which:

FIG. 1 is a plan view of an embodiment of the motor,

FIG. 2 is a section of the motor on line II—II in FIG. 1,

FIG. 3 shows a table illustrating the method according to the invention,

FIGS. 4*a* and 4*b* show graphs of the motor control pulses,

FIG. 10 is a table illustrating a second alternative embodiment of the method according to the invention, FIGS. 12*a* and 12*b* are graphs illustrating signals measured at various points in the circuit shown in FIG. 11, during rotary movement of the motor in the forward direction and in the reverse direction respectively, FIG. 13 is a table illustrating a third alternative embodiment of the method according to the invention.

DESCRIPTION OF THE PREFERRED EMBODIMENTS

Figure 5:
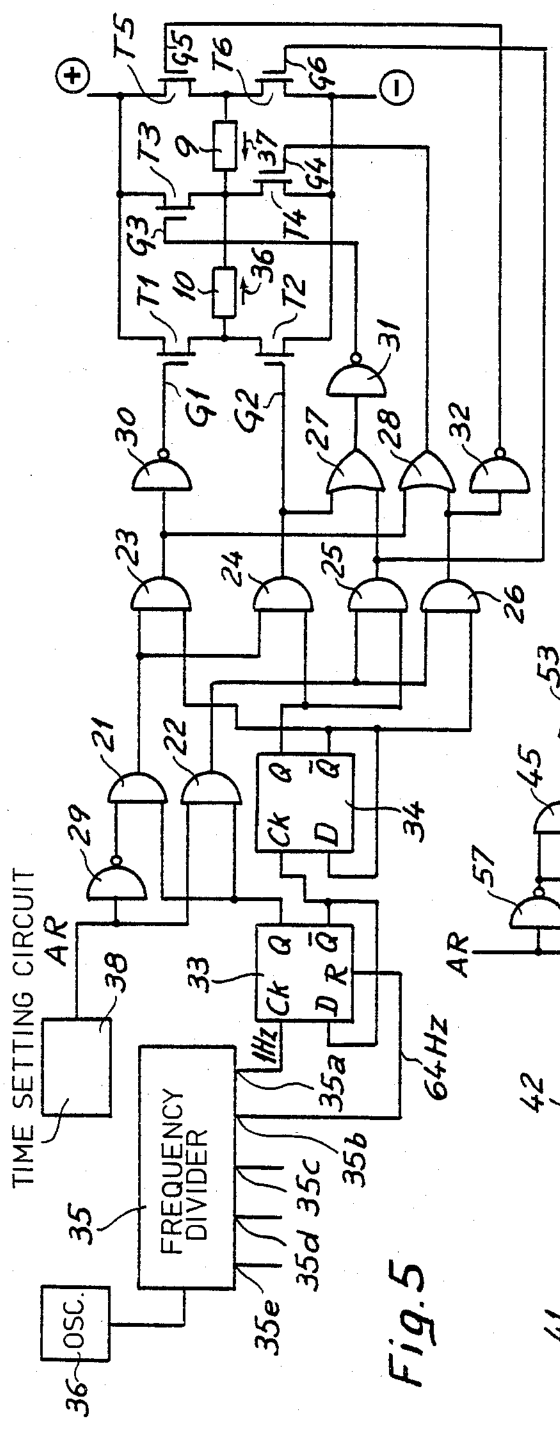
FIG. 5 is a circuit diagram of an embodiment of a circuit for performing the method.

FIGS. 1 and 2 show an embodiment of the motor described in above-mentioned German patent application DE 30 26 004A. In that construction, the motor comprises a stator, the armature of which is formed by two components of soft magnetic material.

A first component 1 is E-shaped with end limbs 1*a* and 1*b* and a central limb 1*c*. The second component 2 is more like a straight bar but has lateral projections 2*a*, 2*b* and 2*c* corresponding to and overlapped by the E-limbs 1*a*, 1*b* and 1*c* respectively, the projections and limbs being held in face contact for example by screws 3 passing through the end limbs 1*a* and 1*b* into the corresponding projections 2*a* and 2*c*.

A circular hole 4 is formed in the component 1, in alignment with the root of the middle limb 1*c*, thereby defining three reduced width portions 1*d*, 1*e* and 1*f* which interconnect the three pole faces of which one is formed by the limb 1*c* and the other two are formed by the two halves of the actual body of the component 1, which are disposed one between the portions 1*d* and 1*e*, and the other between the portions 1*e* and 1*f*.

The rotor of the motor comprises a shaft 5 which is mounted rotatably for example between two elements 6 and 7 of the support structure of the device which comprises the present motor. The shaft 5 carries a bipolar permanent magnet 8, the diametrically opposite poles of which are indicated at N and S in FIG. 1.

The stator of the motor carries two coaxial windings 9 and 10 which are wound on the two straight halves 2*d* of the component 2 of the armature, of which one is disposed between the projection 2*a* and the projection 2*c* of the component 2, while the other is disposed between the projection 2*b* and the projection 2*c* of the component 2. The magnetic field generated by each of the windings 9 and 10 in the space 4 and in the magnet 8 when a current flows through the windings is diagrammatically illustrated in FIG. 1, where it is indicated by C9 and C10 respectively.

It should be noted that, when there is no current in the windings 9 and 10, the rotor is subjected to a positioning torque which tends to hold it in one or other of two rest positions. One of the rest positions is the position illustrated in FIG. 1, the other being the position occupied by the rotor after having rotated through 180°. The variation in the above-mentioned positioning torque, in dependence on the angle of rotation of the rotor, is such that the rotor returns to the position that it occupied if it is left free after having been displaced through an angle of less than approximately 90°, in one direction or the other, and that it rotates to the other rest position if it is left free after having been displaced through an angle of more than approximately 90°.

In FIG. 1, the directions of the fields C9 and C10 form angles of approximately 45° to the direction of the axis of magnetization NS of the magnet 8. In practice, those angles may be between approximately 30° and 60°, depending on the form of the various parts of the stator.

Hereinafter in this description, the currents flowing in the windings 9 and 10 in a direction such that the magnetic field is in the direction indicated by the arrows C9 and C10 will be arbitrarily referred to as positive. Likewise, the direction of rotation indicated by the arrow 11 will be arbitrarily referred to as the direction of positive rotation.

The table shown in FIG. 3 illustrates one method for actuating the motor, in accordance with the invention. The signs + or − in the columns designated I9 and I10 indicate that a positive current and a negative current respectively are applied to the windings 9 and 10 respectively, in the situation illustrated by the line where they occur. The arrows in the columns designated C9 and C10 indicate the direction of the field generated by the currents. The arrows in the last three columns designated Ra, Rb and Rc respectively indicate the initial position of the rotor, the position that it would attain under the influence of the field generated by the windings 9 or 10 if the current were maintained in such windings, and the position that it attains under the influence of the positioning torque when the current is cut off. Those various positions are indicated by arrows pointing from the south pole of the magnet 8, to the north pole thereof.

Line A in the table shown in FIG. 3 illustrates the manner of actuating the motor so that the rotor rotates through one step, that is to say, 180°, in a positive direction, from the position that it occupies in FIG. 1. That position is illustrated in column Ra of line A. A positive current pulse is applied to the winding 10. The field resulting from that pulse is substantially of the direction and the sense indicated by the arrow C10 in FIG. 1. No current is applied to the winding 9. If the intensity of the current is high enough, the rotor is subjected to a torque such that it rotates in the positive direction until it reaches a position at which the direction of the field of the magnet 8 is parallel to the direction of the arrow C10 (column Rb). If the current in the winding 10 is cut off when the rotor reaches that position, it concludes its stepping motion under the influence of the positioning torque. It is then in the position at which the field of the magnet 8 is opposite in direction to the direction it had before the current was applied to the winding 10 (column Rc).

Line B of the table shown in FIG. 3 illustrates the manner of actuating the motor so that the rotor again rotates through one step in the positive direction from the position that it reached at the end of the first step. That position is diagrammatically indicated in column Ra in line B. A current pulse of the same intensity as that in line A of the table is applied to the winding 10, but in the negative direction. The resulting magnetic field is therefore in the same direction as that indicated by the arrow C10, but in the opposite sense. The torque which is applied to the rotor is therefore in the same direction as in the above-described situation, and the rotor again rotates in the positive direction until the direction of the field of the magnet 8 is parallel to that of the field generated by the current flowing in the winding 10 (column Rb). Once again, when the current is cut off, the rotor concludes its stepping motion under the effect of the positioning torque. It is again in the position in which it is shown in FIG. 1, after having performed a complete revolution in the positive direction (column Rc).

It is apparent that, if a positive current pulse is then again applied to the winding 10, the rotor begins another step, as in the case illustrated by line A in the table shown in FIG. 3.

Line C in the table shown in FIG. 3 illustrates the manner of actuating the motor so that the rotor thereof rotates through one step in the negative direction from the position in which it is disposed in FIG. 1 (column Ra).

In that case, a positive current pulse is applied to the winding 9, no current being applied to the winding 10. The field resulting from that pulse is substantially of the direction and the sense indicated by arrow C9 in FIG. 1. The rotor is subjected to a torque such that it rotates in the negative direction until the direction of the field of the magnet 8 becomes parallel to the direction of the arrow C9 (column Rb). When that current is cut off, the rotor completes its stepping motion under the influence of the positioning torque (column Rc). It has therefore rotated half a revolution in the negative direction.

If a negative current pulse is now applied to the winding 9 (line D of the table shown in FIG. 3), the field resulting therefrom is of the same direction as the arrow C9, but the opposite sense. The rotor therefore still rotates in the negative direction until the field of the magnet 8 is in a direction parallel to that of the field generated by the negative current in the winding 9 (column Rb). Once again, when the current is cut off, the rotor concludes its stepping motion under the influence of the positioning torque (column Rc).

The rotor has then performed a complete revolution in the negative direction. If a positive current is again applied to the winding 9, the rotor begins another step, as in the case illustrated by line C.

It will be clear that in practice the current must be cut off at the latest when the rotor reaches the position illustrated by column Rb of the table shown in FIG. 3, or even before that. The duration of the current pulses applied to the winding 10 or the winding 9 is selected in dependence on the characteristics of the motor and/or the load that it drives.

It can be readily seen that the direction of rotation of the rotor may be a matter of free choice, irrespective of the position thereof. When the rotor is in the position that it occupies in FIG. 1, a positive current pulse applied to the winding 10 causes rotation in the positive direction, and a positive current pulse applied to the winding 9 causes rotation in the negative direction. When the rotor is in the opposite position to that shown in FIG. 1, a negative current pulse applied to the winding 10 causes rotation in the positive direction, and a negative current pulse applied to the winding 9 causes rotation in the negative direction.

To sum up, first current pulses are applied alternately in one direction and the other solely to one of the windings to cause the rotor to rotate in one direction, and second current pulses are applied alternately in one direction and the other solely to the other winding, to cause the rotor to rotate in the other direction.

FIG. 4*a* shows the current pulses applied to the winding 10 to cause the rotor to rotate in the positive direction, and FIG. 4*b* shows the pulses applied to the winding 9 to cause the rotor to rotate in the negative direction.

In order for the rotor to rotate through half a step in response to one of those pulses, the rotor must be in the required position, that is to say, it must be in the position that it occupies in FIG. 1, at the moment at which a positive current pulse is applied to the winding 9 or the winding 10, and it must be in its other rest position, at the moment at which a negative current pulse is applied to one or other of the windings.

If, for some reason, that condition is not fulfilled, that is to say, the rotor is in the position shown in FIG. 1 and a negative pulse is applied to one of the windings, or it is in its other rest position and a positive pulse is applied to that winding, the rotor begins to rotate in the opposite direction to the direction corresponding to the winding to which the current is applied. However, it turns only through a small angle which is less than the angle corresponding to half a step. The positioning torque to which it is subjected does not therefore change in sign and the rotor returns to its starting position at the end of the pulse.

The following pulse will therefore be of the correct polarity to cause the rotor to rotate by one step, in the desired direction. Therefore, the direction of rotation is not reversed when the rotor is not in the position in which it should be at the moment at which a pulse is applied to one of the windings.

Figures 6A, 6B, 7:
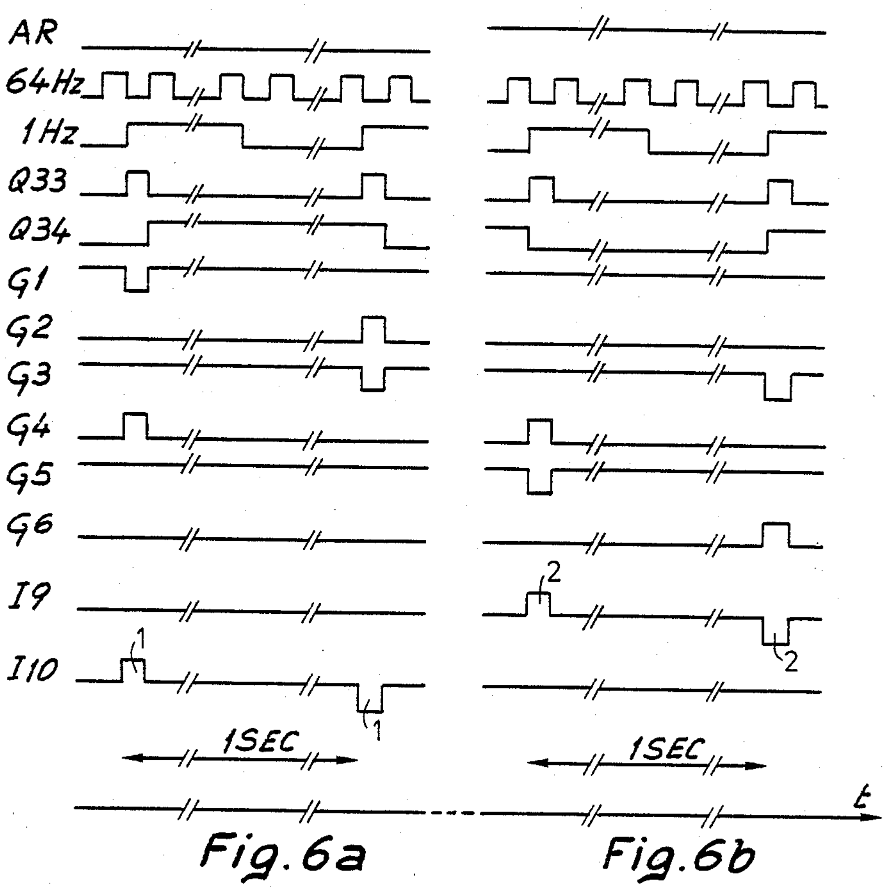
FIGS. 6*a* and 6*b* are graphs representing signals measured at various points in the circuit shown in FIG. 5, during rotary movement of the motor in the forward direction and in the reverse direction respectively.
FIG. 7 is a table illustrating a first alternative embodiment of the method according to the invention.

FIG. 5 shows the circuit diagram of an embodiment of a circuit for performing the method according to FIG. 3, and FIGS. 6*a* and 6*b* show some signals measured at various points in the circuit.

In this example, as in the examples which will be described hereinafter, the motor is used in an electronic watch for driving hands (not shown) for displaying hours, minutes and seconds, by means of a gear train (also not shown). It will be apparent that the examples given herein are not limiting and that the invention can be used irrespective of the device or apparatus in which the motor is incorporated.

The windings 9 and 10 of the motor are connected in a double bridge arrangement formed by six MOS transistors indicated at T1 to T6. The transistors T1, T3 and T5 are of p type and have their source connected to the positive terminal of the power supply source. The transistors T2, T4 and T6 are of n type and have their source connected to the negative terminal of the power supply source. The drains of the transistors T1 and T2, T3 and T4, T5 and T6 are respectively connected to a first terminal of the winding 10, to the second terminal of the winding 10 and to a first terminal of the winding 9, and to the second terminal of the winding 9.

The gates G1 to G6 of the transistors T1 to T6 are connected to a logic circuit formed by six AND-gates 21 to 26, two OR-gates 27 and 28, four inverters 29 to 32 and two D-type flip-flops 33 and 34, which are connected together in the manner illustrated. That logic circuit will not be described in greater detail herein as the mode of operation thereof, which is illustrated by the diagrams shown in FIGS. 6*a* and 6*b*, is easy to understand.

The logic circuit receives two periodic signals at respective frequencies of 1 Hz and 64 Hz, supplied by outputs 35*a* and 35*b* of a frequency divider 35. The divider 35 receives a signal at a frequency of for example 32768 Hz from a quartz oscillator 36. At its outputs denoted by 35*c*, 35*d* and 35*e*, it also produces other periodic signals at respective frequencies of 128, 256 and 2048 Hz which will be used in circuits described hereinafter.

The logic circuit also receives a signal AR for determining the direction of rotation of the motor, which is supplied for example by a time setting circuit 38, which may be of any kind and which will not be described herein.

In the illustrated example, the signal AR is at logic state "0" when the rotor is to rotate in the positive direction and logic state "1" when the rotor is to rotate in the negative direction.

It will be readily seen that the output Q of the flip-flop 33 produces control pulses which are at logic state "1" for about 7.8 milliseconds, with a period of one second. Between those control pulses, the gates of the transistors T1, T3 and T5 are at logic state "1" and the gates of the transistors T2, T4 and T6 are at logic state "0". As states "1" and "0" are respectively represented by the voltage of the positive terminal of the power supply source and the voltage of the negative terminal of the power supply source, the six transistors T1 to T6 are in a non-conducting condition.

At the end of each control pulse supplied by the output Q of the flip-flop 33, the flip-flop 34 changes state. Its output Q therefore remains at state "0" and at state "1" alternately for one second.

It will be assumed to begin with that the output Q of the flip-flop 34 is at state "0" and that the output $\overline{Q}$ is therefore at state "1".

When the motor is to rotate in the positive direction, the signal AR is at "0" (see FIG. 6*a*). In those circumstances, a control pulse supplied by the output Q of the flip-flop 33 is transmitted by the gate 21 and applied to the gate G1 of the transistor T1 by way of the gate 23 and inverter 30, and to the gate G4 of the transistor T4 by way of the gate 28. During that pulse, the gate G4 therefore goes to state "1" and the gate G1 goes to state "0". The transistors T1 and T4 are therefore switched on, and a current pulse passes through the winding 10 in the direction indicated by the arrow 36*a*. If the wire forming the winding 10 is wound in a suitably selected direction, that pulse generates a magnetic field in the direction of the arrow C10 in FIG. 1. That situation therefore corresponds to the situation indicated by line A in the table shown in FIG. 3. If in addition, before the beginning of the pulse, the rotor is in the position shown in FIG. 1, it rotates through half a revolution in the positive direction.

The end of the control pulse supplied by the output Q of the flip-flop 33 causes the flip-flop 34 to switch over, the output Q thereof going to state "1". One second later, the output Q of the flip-flop 33 produces a new control pulse which also passes through the gate 21 and is applied, this time, to the gate G2 of the transistor T2 by way of the gate 24 and to the gate G3 of the transistor T3 by way of the gate 27 and the inverter 31. Those two transistors T2 and T3 are therefore switched on, and a current pulse passes through the winding 10 in the opposite direction to the direction indicated by the arrow 36*a*. The rotor therefore again turns through one step in the positive direction. That situation corresponds to that shown in line B of the table in FIG. 3.

That procedure is repeated at each control pulse supplied by the output Q of the flip-flop 33, as long as the signal AR is still at state "0".

If the signal AR is at state "1" (see FIG. 6*b*), the control pulses supplied by the output Q of the flip-flop 33 are transmitted by the gate 22. When the output Q of the flip-flop 33 is at state "0", those pulses are transmitted by the gate 26 and are applied to the gate G4 of the transistor T4 by way of the gate 28 and to the gate G5 of the transistor T5 by way of the inverter 32. Those two transistors T4 and T5 are therefore switched on, and a current pulse is applied to the winding 9 in the direction indicated by the arrow 37. That pulse generates a magnetic field in the direction indicated by the arrow C9 in FIG. 1, and the rotor rotates through one step in the negative direction. That situation therefore corresponds to the situation illustrated by line C of the table in FIG. 3.

The following control pulse which is supplied one second later by the output Q of the flip-flop 33 is also transmitted by the gate 22. As the output Q of the flip-flop 34 is now at state "1", that pulse passes through the gate 25 and reaches the gate G6 of the transistor T6. That pulse is also applied to the gate G3 of the transistor T3 by way of the gate 27 and the inverter 31. The transistors T3 and T6 are therefore switched on and a current pulse flows through the winding 9 in the opposite direction to the arrow 37. That situation corresponds to the situation shown in the fourth line of the table in FIG. 3, and the rotor therefore again rotates through one step in the negative direction.

To sum up, in response to control signals, the device applies first current pulses to a first winding in one direction and in the other direction alternately, when the signal for determining the direction of rotation of the rotor is in its first state, and second current pulses to the second winding in one direction and in the other direction alternately, when the signal for determining the direction of rotation of the rotor is in its second state. In the described example, the control signal is formed by the pulses applied by the output Q of the flip-flop 33.

The torque produced by the motor when it is actuated in accordance with the above-described process is sufficient in most cases. It is however possible to increase the torque produced, if required, by using an alternative form of the described method.

The table shown in FIG. 7 summarizes a first alternative form of the method according to the invention.

In order to cause the rotor to rotate by one step in the positive direction, from the position that it occupies in FIG. 1, a current pulse of positive direction is first applied to the winding 10, as in the above-described process (see line A1 of the table shown in FIG. 7). No current is applied to the winding 9. The field C10 generated by the current moves the rotor into the position shown at column Rb1 in line A1.

The current in the winding 10 is then cut off and a current pulse, which is also positive in direction, is applied to the winding 9 (see line A2 of the table shown in FIG. 7). The field C9 resulting from that current moves the rotor into the position shown in column Rb2.

When the current in the winding 9 is cut off, the positioning torque moves the rotor into the position shown in column Rc of line A2 of the table shown in FIG. 7.

In order to cause the rotor to rotate through a second step, still in the positive direction, a current pulse of negative direction is applied to the winding 10, and then a current pulse of negative direction is applied to the winding 9. Lines B1 and B2 of the table shown in FIG. 7 indicate those various currents, the fields produced thereby and the positions to which the rotor moves in response to those fields and under the influence of the positioning torque.

In order to cause the rotor to rotate by one step in the negative direction, from the position shown in FIG. 1, a current pulse of positive direction is applied to the winding 9.

A current pulse which is also positive in direction is then applied to the winding 10 and finally the positioning torque moves the rotor into its second rest position. Lines C1 and C2 of the table shown in FIG. 7 indicate the various currents, the resulting fields and the positions to which the rotor moves in response to those fields and under the influence of the positioning torque.

In order to cause the rotor to rotate by another step in the negative direction, a current pulse of negative direction is applied to the winding 9, and then a current pulse of negative direction is applied to the winding 10. Lines D1 and D2 in the table shown in FIG. 7 indicate the various currents, the resulting fields and the positions reached by the rotor in response to those fields and under the influence of the positioning torque.

Thus, in this embodiment of the method, as in the method described above, first current pulses are applied to a first winding alternately in a first direction and in the second direction to cause the rotor to rotate in a first direction, and second current pulses are applied to the second winding alternately in the first direction and in the second direction, to cause the rotor to rotate in the second direction.

In addition, a third pulse is applied to the second winding after each first pulse, and a fourth pulse if applied to the first winding after each second pulse. The direction of the third pulse or the fourth pulse is in each case the same as the direction of the immediately preceding first or second pulses respectively.

In this way, the torque produced by the motor is substantially increased, without its consumption increasing in the same proportions. In addition, it is still possible for the motor to be controlled by means of a circuit which comprises only six power transistors.

Figure 8:
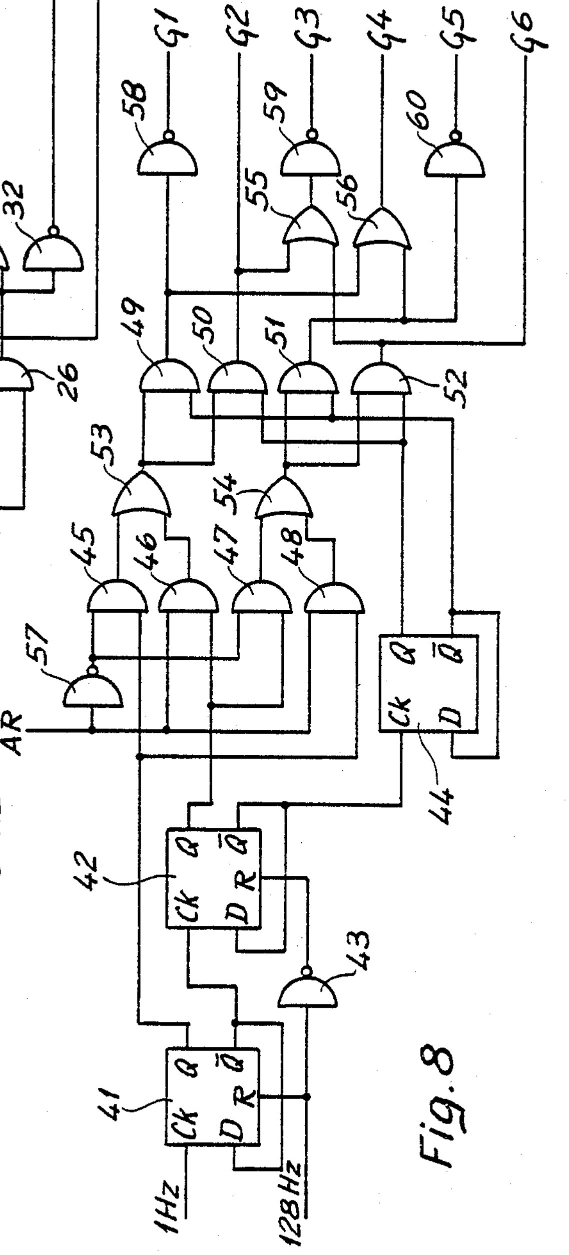
FIG. 8 is a circuit diagram of an embodiment of a circuit for performing the first alternative embodiment of the method.
Figure 9A:
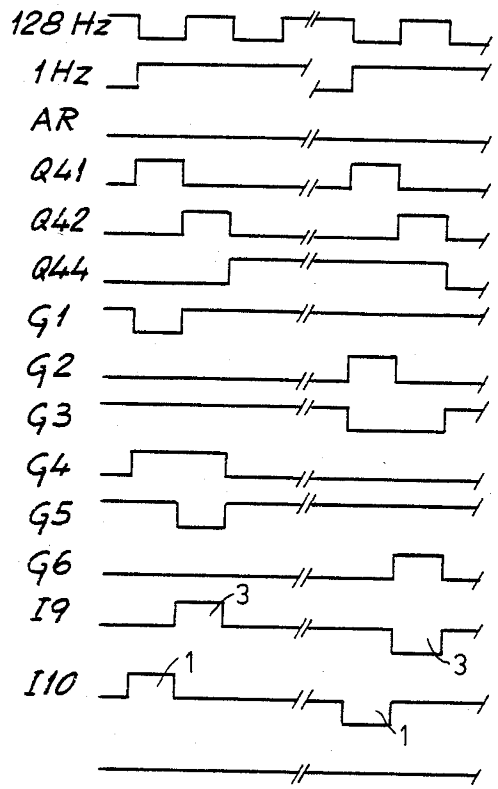
FIGS. 9*a* and 9*b* are diagrams showing signals measured at various points in the circuit illustrated in FIG. 8, during rotary movement of the motor in the forward direction and in the reverse direction respectively.
Figure 9B:
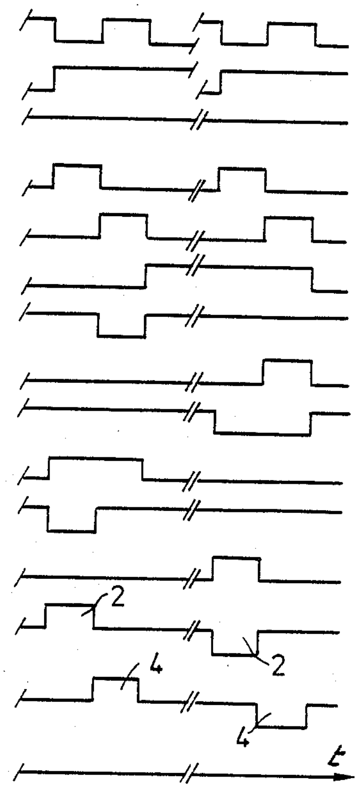

FIG. 8 shows the circuit diagram of an embodiment of a circuit for performing the alternative form of the method in accordance with FIG. 7, while FIGS. 9*a* and 9*b* are graphs showing signals measured at various points in the circuit.

The circuit shown in FIG. 8 comprises a D-type flip-flop 41, the output Q of which goes to state "1" whenever the output 35*a* of the frequency divider 35 (not shown in FIG. 8) goes to state "1". The reset input R of the flip-flop 41 is connected to the output 35*c* of the frequency divider (not shown), which produces a signal at a frequency of 128 Hz. The output Q of the flip-flop 41 therefore goes back to state "0", 3.9 milliseconds after having gone to state "1".

At that moment, the output Q of a second D-type flip-flop 42 goes to state "1". The reset input R of the flip-flop 42 being connected to the output 35*c* of the divider which produces the signal at a frequency of 128 Hz, by way of an inverter 43, the output Q thereof goes back to state "0" also 3.9 milliseconds after having gone to state "1".

A third D-type flip-flop 44 switches over at the end of each pulse supplied by the output Q of the flip-flop 42. The output Q of the flip-flop 44 therefore remains alternately at state "0" and at state "1", for a period of one second.

The two consecutive control pulses supplied in each second by the outputs Q of the two flip-flops 41 and 42 are transmitted to the gates G1 and G6 of the transistors T1 to T6 which are identical to those shown in FIG. 5 but are not illustrated in FIG. 8, by means of a logic circuit comprising AND-gates 45 to 52, OR-gates 53 to 56 and inverters 57 to 60, which are connected together in the manner illustrated. This logic circuit will not be described in greater detail herein as the mode of operation thereof, which is illustrated by the diagrams shown in FIGS. 9*a* and 9*b*, is easy to understand.

When the signal AR which is identical to the signal AR in FIG. 5 is at state "0" (FIG. 9*a*) and the output Q of the flip-flop 44 is also at state "0", each first control pulse supplied by the output Q of the flip-flop 41 switches on the transistors T1 and T4. A current pulse therefore flows in the positive direction in the coil 10 (line A1 in FIG. 7). In the same circumstances, each second control pulse supplied by the output Q of the flip-flop 42 switches on the transistors T4 and T5, which causes a current pulse to flow in the winding 9, also in the positive direction (line A2, FIG. 7).

When the signal AR is at state "0" and the output Q of the flip-flop 44 is at state "1", each first control pulse supplied by the output Q of the flip-flop 41 switches on the transistors T2 and T3. A current pulse therefore flows in the winding 10 in the negative direction (line B1, FIG. 7). Each second control pulse supplied by the output Q of the flip-flop 42 switches on the transistors T3 and T6. A current pulse therefore flows in the winding 9, also in the negative direction (line B2, FIG. 7).

When the signal AR is at state "1" (see FIG. 9*b*) and the output Q of the flip-flop 44 is at state "0", each first control pulse supplied by the output Q of the flip-flop 41 causes a positive current pulse to flow in the winding 9 (line C1 in FIG. 7), and each second control pulse supplied by the output Q of the flip-flop 42 causes a current pulse which is also positive to flow in the winding 10 (line C2 in FIG. 7).

When the signal AR is at state "1" and the output Q of the flip-flop 44 is also at state "1", each first control pulse supplied by the output Q of the flip-flop 41 causes a negative current pulse to flow in the winding 9 (line D1 in FIG. 7), and each second control pulse supplied by the output Q of the flip-flop 42 causes a current pulse, which is also negative, to flow in the winding 10 (line D2 in FIG. 7).

To sum up, the device shown in FIG. 8 supplies the motor windings with the same first and second pulses as the device shown in FIG. 5, in response to a control signal. In addition, it applies a third current pulse to the second winding after each first pulse and a fourth current pulse to the first winding after each second pulse. The third and fourth pulses are of the same direction as the immediately preceding first and second pulses respectively.

In this example, the control signal is formed by the pulses supplied by the outputs Q of the flip-flops 41 and 42.

In the example shown in FIG. 8, the control pulses supplied by the outputs Q of the flip-flops 41 and 42 follow each other without any interval and have each a duration equal to half the duration of the pulses supplied by the output Q of the flip-flop 33 in the FIG. 5 embodiment. However, that is not an obligatory feature, and it is possible to choose different durations for the control pulses in order to adapt them to the characteristics of the motor and/or the load that the motor drives. It is also possible to have a small time interval between control pulses, rather than having the beginning of the second one coincident with the end of the first one.

The table shown in FIG. 10 summarizes a second alternative embodiment of the method according to the invention.

In order to cause the rotor to rotate by one step in the positive direction, from the position that it occupies in FIG. 1, a current pulse of negative sense is first applied to the winding 9 (line A1 of the table shown in FIG. 10). No current is applied to the winding 10. The field C9 which is generated by that pulse moves the rotor into the position indicated at column Rb1 in line A1.

The current in the winding 9 is cut off, and a positive current pulse is applied to the winding 10 (line A2 in the table shown in FIG. 10). No current is applied to the winding 9. The field C10 resulting from that pulse moves the rotor into the position shown in column Rb2. When the current in the winding 10 is cut off, the positioning torque moves the rotor into position indicated in column Rc in line A2.

In order to cause the rotor to rotate by a second step, still in the positive direction, a positive current pulse is applied to the winding 9 and then a negative current pulse is applied to the winding 10. Lines B1 and B2 in the table shown in FIG. 10 indicate those various currents, the fields resulting therefrom and the positions reached by the rotor in response to those fields and under the influence of the positioning torque.

In order to cause the rotor to rotate by one step in the negative direction, from the position shown in FIG. 1, a negative current pulse is applied to the winding 10. A positive current pulse is then applied to the winding 9 and finally the positioning torque moves the rotor into its second rest position. Lines C1 and C2 in the table shown in FIG. 10 indicate the various currents, the resulting fields and the positions reached by the rotor in response to the fields and under the influence of the positioning torque.

In order to cause the rotor to rotate by another step in the negative direction, a positive current pulse is applied to the winding 10 and then a negative current pulse is applied to the winding 9. Lines D1 and D2 in the table shown in FIG. 10 indicate the various currents, the resulting fields and the positions reached by the rotor in response to those fields and under the influence of the positioning torque.

Thus, in that second alternative embodiment, as in the method and the first alternative embodiment hereinbefore, first current pulses are applied to a first winding in a first direction and the second direction alternately to cause the rotor to rotate in a first direction, and second current pulses are applied to the second winding in the first direction and the second direction alternately to cause the rotor to rotate in the second direction. As in the first alternative embodiment, a third pulse is applied to the second winding after each first pulse and a fourth pulse is applied to the first winding after each second pulse.

It should be noted however that, in this second alternative embodiment, the winding to which the first pulses are applied is the winding to which the second pulses are applied in the method and in the first alternative embodiment which are described above, and vice-versa. Likewise, the direction of the current which is to be applied to cause the rotor to rotate in a given direction from a given position is in each case the reverse of the direction of the current which is applied under the same conditions in the method and in the first alternative embodiment thereof, as described above. In addition, and contrary to what occurs in the first alternative embodiment, the direction of the third and fourth pulses is in each case the opposite direction to that of the immediately preceding first and second pulses respectively.

Figure 11:
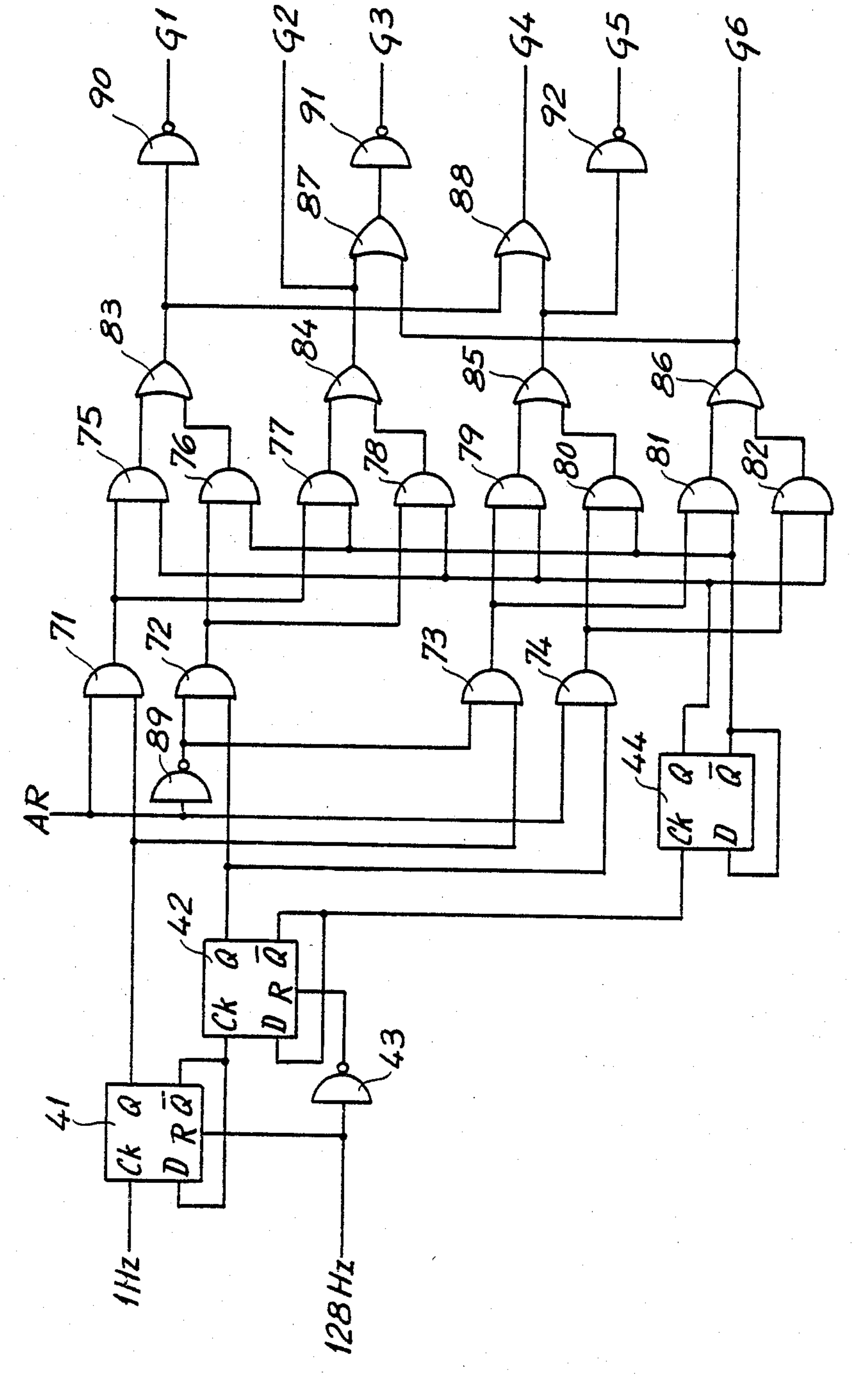
FIG. 11 shows the circuit diagram of an embodiment of a circuit for performing the second alternative embodiment of the method.

FIG. 11 shows an example of a circuit for performing this alternative embodiment of FIG. 10, while FIGS. 12*a* and 12*b* are graphs showing signals measured at various points in the circuit when the rotot rotates respectively in the positive direction and in the negative direction.

The flip-flops 41, 42 and 44 and the inverter 43 shown in FIG. 11 are precisely the same and operate in the same manner as those shown in FIG. 8.

The two control pulses supplied by the outputs of the flip-flops 41 and 42 are transmitted to the gates G1 to G6 of the transistors T1 to T6 which are identical to those shown in FIG. 5 but which are not shown in FIG. 11, by a logic circuit comprising AND-gates 71 to 82, OR-gates 83 to 88 and the inverters 89 to 92, which are interconnected in the manner illustrated.

That circuit will not be described in greater detail as it can readily be seen from FIGS. 12*a* and 12*b* that the first control pulses supplied by the output Q of the flip-flop 41 cause first current pulses to flow in the winding 9 or second current pulses to flow in the winding 10, depending on the state of the signal AR, and the second control pulses supplied by the output Q of the flip-flop 42 cause third current pulses to flow in the winding 10 or fourth current pulses to flow in the winding 9, once again depending on the state of the signal AR. The direction of those current pulses is also determined by the state of the outputs Q and $\overline{Q}$ of the flip-flop 44. That state changes at the end of each pulse supplied by the output Q of the flip-flop 42, that is to say, at the end of each stepping motion of the rotor.

The motor control in accordance with a third alternative embodiment of the method permits the torque produced by the motor to be increased, in comparison with the torque output produced by the motor when it is controlled in accordance with the second alternative embodiment, without excessively increasing the power consumption thereof.

The table shown in FIG. 13 summarizes the third alternative embodiment. Lines A1, A2, B1, B2, C1, C2, D1 and D2 of the table shown in FIG. 13 are identical to the corresponding lines of the table shown in FIG. 10.

To cause the rotor to rotate by one step in the positive direction, from the position that it occupies in FIG. 1, a negative current pulse is applied to the winding 9 and then a positive current pulse is applied to the winding 10, as in the second alternative embodiment described above (lines A1 and A2 in FIG. 13).

Then, a current pulse is again applied to the winding 9, being a positive current pulse in this case, without the current being cut off in the winding 10. The fields C9 and C10 which result from those currents are combined to apply to the rotor a torque which adds to the positioning torque for moving the rotor to its second rest position (line A3 in FIG. 13).

In order to cause the rotor to rotate by another step in the positive direction, a positive current pulse is applied to the winding 9 and then a negative current pulse is applied to the winding 10 (lines B1 and B2 in FIG. 13).

A negative current pulse is then again applied to the winding 9, without the current in the winding 10 being cut off. The fields C9 and C10 which result from those currents are again combined to apply a torque which adds to the positioning torque for moving the rotor back to the position that it occupies in FIG. 1 (line B3 in FIG. 13).

Similarly, to cause the rotor to rotate by one step in the negative direction from its position in FIG. 1, the same current pulses as in the second alternative embodiment are applied to the windings 9 and 10 (lines C1 and C2 in FIG. 13), and then a positive current pulse is applied to the winding 10 without cutting off the current in the winding 9 (line C3 in FIG. 13).

In order to cause the rotor to rotate by another step in the negative direction, the same current pulses as in the second alternative embodiment are applied to the windings 9 and 10 (lines D1 and D2 in FIG. 13), and then a negative current pulse is applied to the winding 10 without the current in the winding 9 being cut off (line D3 in FIG. 13).

To sum up, in this third alternative embodiment, the first, second, third and fourth current pulses are applied in the same manner as in the second alternative embodiment. In addition, a fifth current pulse is applied to the first winding after the beginning of each third pulse and a sixth current pulse is applied to the second winding after the beginning of each fourth pulse, without the third pulse or the fourth pulse being cut off. The direction of the fifth pulse or the sixth pulse is opposite to the direction of the immediately preceding first pulse or second pulse.

Figure 14:
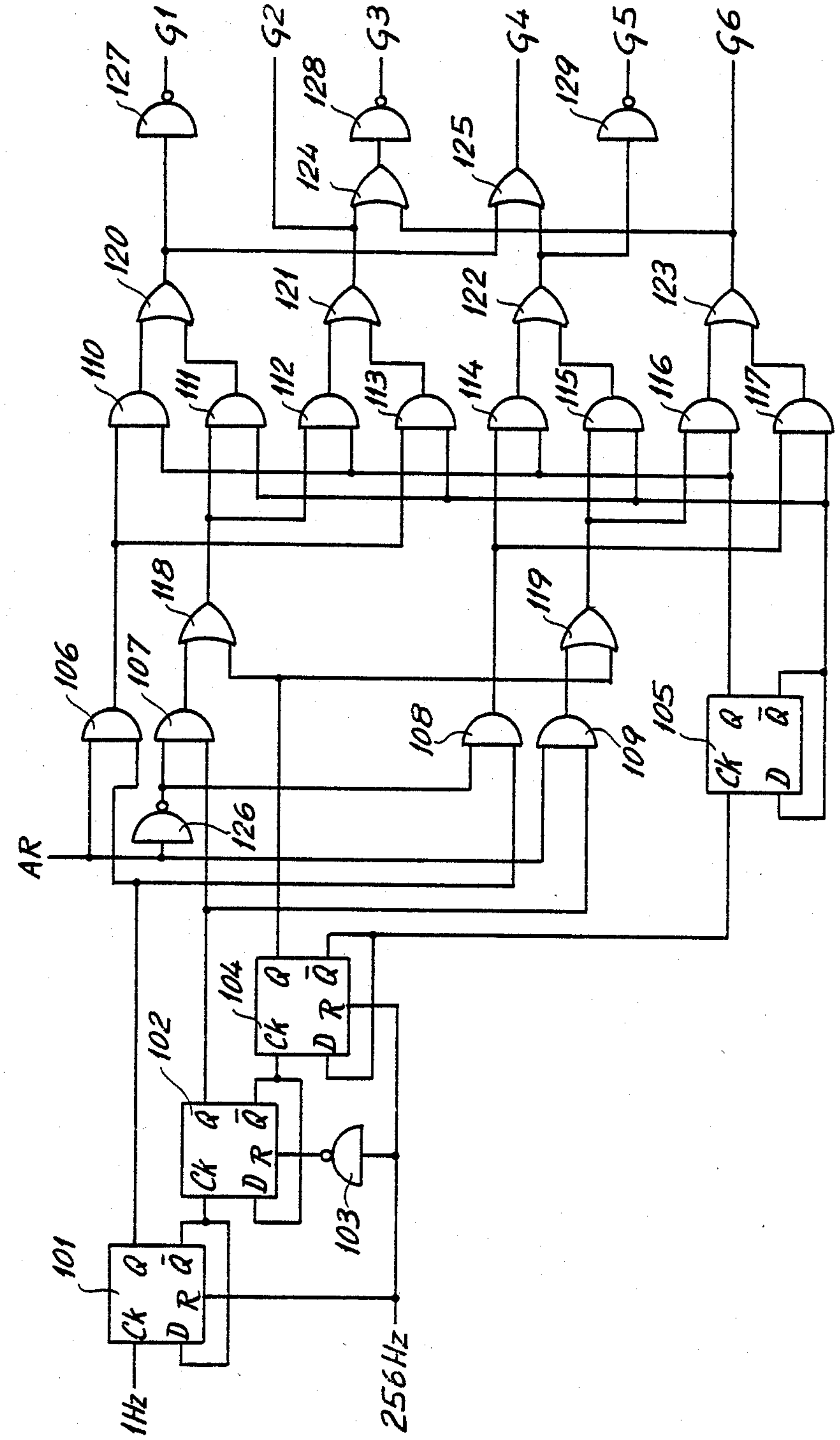
FIG. 14 shows the circuit diagram of an embodiment of a circuit for performing the third alternative embodiment of the method.
Figures 15A, 15B:
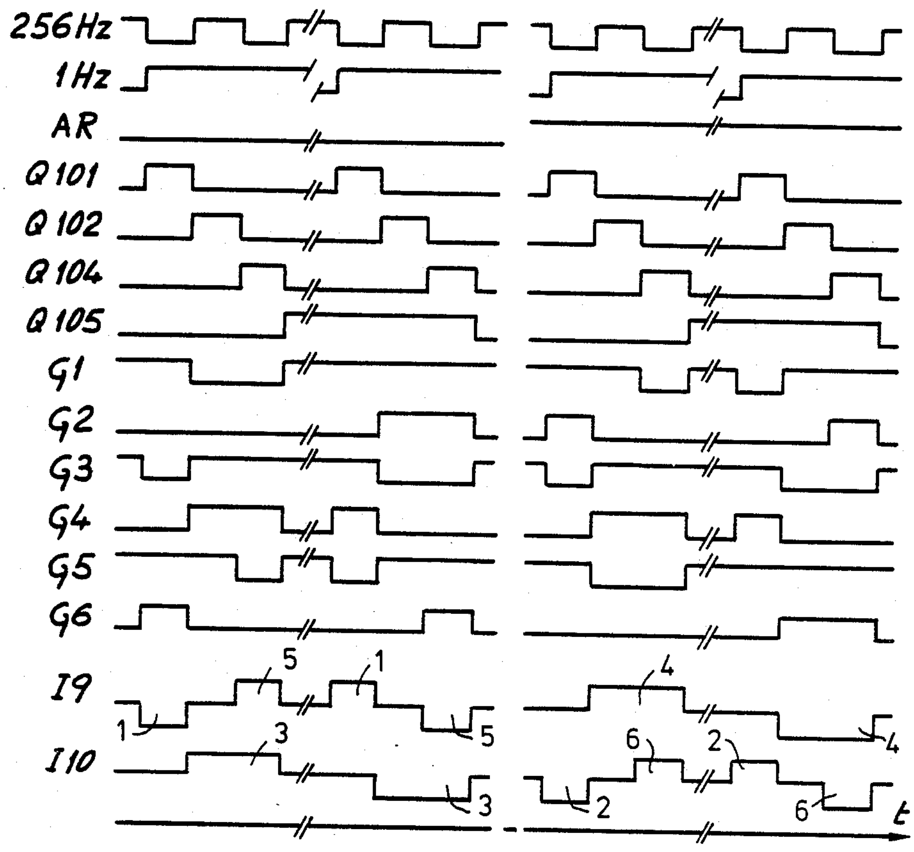
FIGS. 15*a* and 15*b* are graphs illustrating signals measured at various points in the circuit shown in FIG. 14, during rotary movement of the motor in a forward direction and in a reverse direction respectively.

FIG. 14 shows an example of a circuit for performing the third alternative embodiment of the method while FIGS. 15*a* and 15*b* graphs showing signals measured at various points in the circuit.

The circuit shown in FIG. 14 comprises a D-type flip-flop 101, the clock input Ck of which receives the signal at a frequency of 1 Hz from the output 35*a* of the divider 35 (not shown in FIG. 14; see FIG. 5). The output $\overline{Q}$ of the flip-flop 101 is connected to its input D so that its output Q goes to state "1" whenever the signal at a frequency of 1 Hz itself goes to state "1". The reset input R of the flip-flop 101 receives a signal at a frequency of 256 Hz from the output 35*d* of the divider 35. The output Q of the flip-flop 101 therefore goes back to state "0" about 1.9 millisecond after having switched to state "1". At that moment, the output Q of a flip-flop 102, which is also of D-type and the clock input Ck of which is connected to the output $\overline{Q}$ of the flip-flop 101, goes to state "1". As the reset input R of the flip-flop 102 receives the signal at a frequency of 256 Hz supplied by the output 35*d* of the divider 35, by way of an inverter 103, the output Q of the flip-flop 102 goes back to state "0" about 1.9 millisecond after having switched to state "1". At that moment, the output Q of a flip-flop 104, which is also of D-type and the clock input Ck of which is connected to the output $\overline{Q}$ of the flip-flop 102, goes to state "1". The input R of the flip-flop 104 also receiving the signal at a frequency of 256 Hz, the output Q thereof goes back to state "0" also 1.9 millisecond approximately after having switched to state "1".

The outputs Q of the flip-flops 101, 102 and 104 therefore supply three successive pulses, every second.

Whenever the output $\overline{Q}$ of the flip-flop 104 goes to state "1", a flip-flop 105 which is also of D-type switches over. The output Q thereof therefore remains alternately at state "0" and at state "1", for a period of a second.

The three control pulses which are respectively supplied by the outputs Q of the flip-flops 101, 102 and 104 are transmitted to the gates G1 to G6 of the transistors T1 to T6 which are identical to those shown in FIG. 5 and which are not shown in FIG. 14, by a logic circuit comprising the AND-gates 106 to 117, the OR-gates 118 to 125 and the inverters 126 to 129, which are interconnected in the manner illustrated.

That logic circuit will not be described in greater detail herein as it can be readily seen from FIGS. 15*a* and 15*b* that, as in the second alternative embodiment described above, the first control pulses supplied by the output Q of the flip-flop 101 cause first current pulses to flow in the winding 9 or second current pulses to flow in the winding 10, depending on the logic state of the signal AR, and the second control pulses supplied by the output Q of the flip-flop 102 cause third current pulses to flow in the winding 10 or fourth current pulses to flow in the winding 9, still depending on the state of the signal AR. In addition, the third current pulses supplied by the output Q of the flip-flop 104 maintain the third or fourth current pulses, and at the same time cause fifth current pulses to flow in the winding 9, in the opposite direction to the immediately preceding first pulse, or cause sixth current pulses to flow in the winding 10 in the opposite direction to the immediately preceding second pulse.

The three control pulses supplied by the outputs Q of the flip-flops 101, 102 and 104 are of equal duration in the above-described example. It will be apparent that the pulses could be of different durations, being adapted to the characteristics of the motor and/or the load that it drives.

In the above-described third alternative embodiment of the method, a current flows in the two motor windings during the fifth or sixth pulses. Therefore, during the fifth or sixth pulses, the power supply source of the device is required to supply twice the current supplied during the other pulses. That can result in a temporary reduction in the voltage of the power supply source, with all the disadvantages that that entails.

In order to avoid such disadvantages, it is possible for the current to be cut off alternately in one winding and the other, during the fifth and sixth pulses respectively. In this way, the power source of the apparatus is required to supply the same current in all cases.

Figure 16:
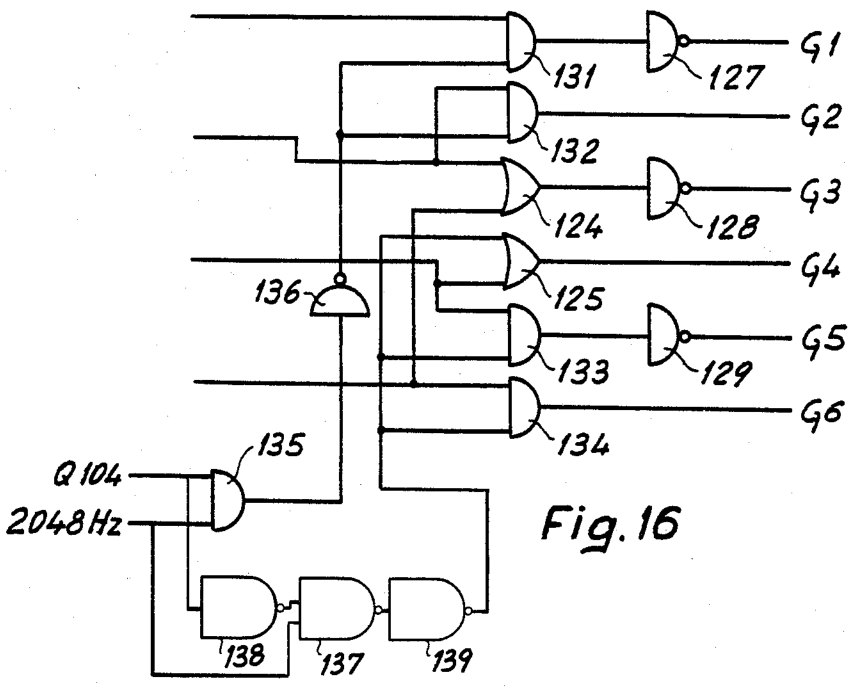
FIG. 16 shows the circuit diagram of an alternative form of the circuit shown in FIG. 14.

The circuit shown in FIG. 16 which is complementary to the circuit shown in FIG. 14 provides the above-mentioned effect of cutting off the current alternately in one winding and the other, during the fifth and sixth pulses respectively. The circuit shown in FIG. 16 comprises four AND-gates 131 to 134, each having a first input respectively connected to the output of one of the gates 120 to 123 shown in FIG. 14. The outputs of the gates 131 to 134 are respectively connected to the input of the inverter 127, the gate G2, the input of the inverter 129 and the gate G6.

An AND-gate 135 has its first input connected to the output Q of the flip-flop 104 shown in FIG. 14, while its second input is connected to the output 35*e* of the divider 35 shown in FIG. 5 but not shown in FIG. 16. That output supplies a signal at a frequency for example of 2048 Hz. The output of the gate 135 is connected by way of an inverter 136, to the second inputs of the gates 131 and 132. AND-gate 137 has its first input also connected to the output Q of the flip-flop 104, while its second input is connected, by way of an inverter 138, to the output 35*e* of the divider 35. The output of that gate 137 is connected, by way of an inverter 139, to the second inputs of the gates 133 and 134 and to the first input of gate 125, which is no more connected to the output of gate 120 as it was in the circuit of FIG. 14. The remainder of the circuit shown in FIG. 14 is unaltered.

When, during a third control pulse supplied by the output Q of the flip-flop 104, the two windings are to carry positive currents (being the situation at lines A3 and C3 in the table shown in FIG. 13), the outputs of the OR-gates 120 and 122 go to state "1". FIG. 16 shows that, in that situation, the gate G5 of the transistor T5 is set to state "0" only when the signal at a frequency of 2048 Hz is at state "1". Likewise, the gate G1 of the transistor T1 is set to state "0" only when the 2048 Hz signal is at state "O". The transistor T1 is therefore switched off when the transistor T5 is switched on, and vice-versa. On the other hand, the transitor T4 remains permanently switched on. This means that the current flows alternately through the two windings.

When the two windings are to carry negative currents (being the case at lines B3 and D3 in the table shown in FIG. 13), it is the outputs of the OR-gates 121 and 123 which go to state "1". In that case, the gate G6 of the transistor T6 is set to state "1" only when the 2048 Hz signal is also at state "1", and the gate G2 of the transistor T2 is set to state "1" only when that signal is at state "0". The transistor T2 is therefore switched off when the transistor T6 is switched on, and vice-versa. In contrast, the transistor T3 remains permanently switched on. This means that a current also flows alternately through the two windings.

In the method and in the alternative forms thereof, as described above, the various current pulses applied to the windings are of predetermined durations. It will be appreciated that it is possible for the duration of those pulses to be adjusted to the magnitude of the load which is actually driven by the motor, in order to minimize the level of consumption of electrical energy of the system.

The circuits for performing the above-mentioned adjustment, which are well known and which will not be described herein, generally measure the value of an electrical parameter which is dependent on the current flowing in the winding, compare that measured value to a reference value, and use the result of the comparison operation to modify the duration of the current pulses in dependence on the load driven by the motor. Hence, when the load on the motor is great, the duration of the current pulses is increased, and when the load is reduced, the duration is decreased.

Such circuits generally comprise a resistor which is connected in series with the motor winding. The voltage drop in the resistor, which is proportional to the current flowing in the winding, is used as the input parameter of the adjusting circuit. The presence of the resistor results in a reduction in the voltage applied to the motor and an increase in the power consumption of the system.

In the method according to the invention and in the first two alternative embodiments thereof, a current flows through only one of the two windings, at any moment. This is also the situation during the first and second control pulses, in the third alternative embodiment.

That particular factor makes it possible for the duration of the first, second, third and fourth current pulses to be adjusted in dependence on the load driven by the motor, without the need for a resistor to be connected in series with the windings. It is sufficient for that purpose, for example, to measure, during each current pulse applied to one of the windings, the voltage induced in the other winding which does not carry the current. That measurement may be used to adjust the duration of the current pulses.

Figure 17:
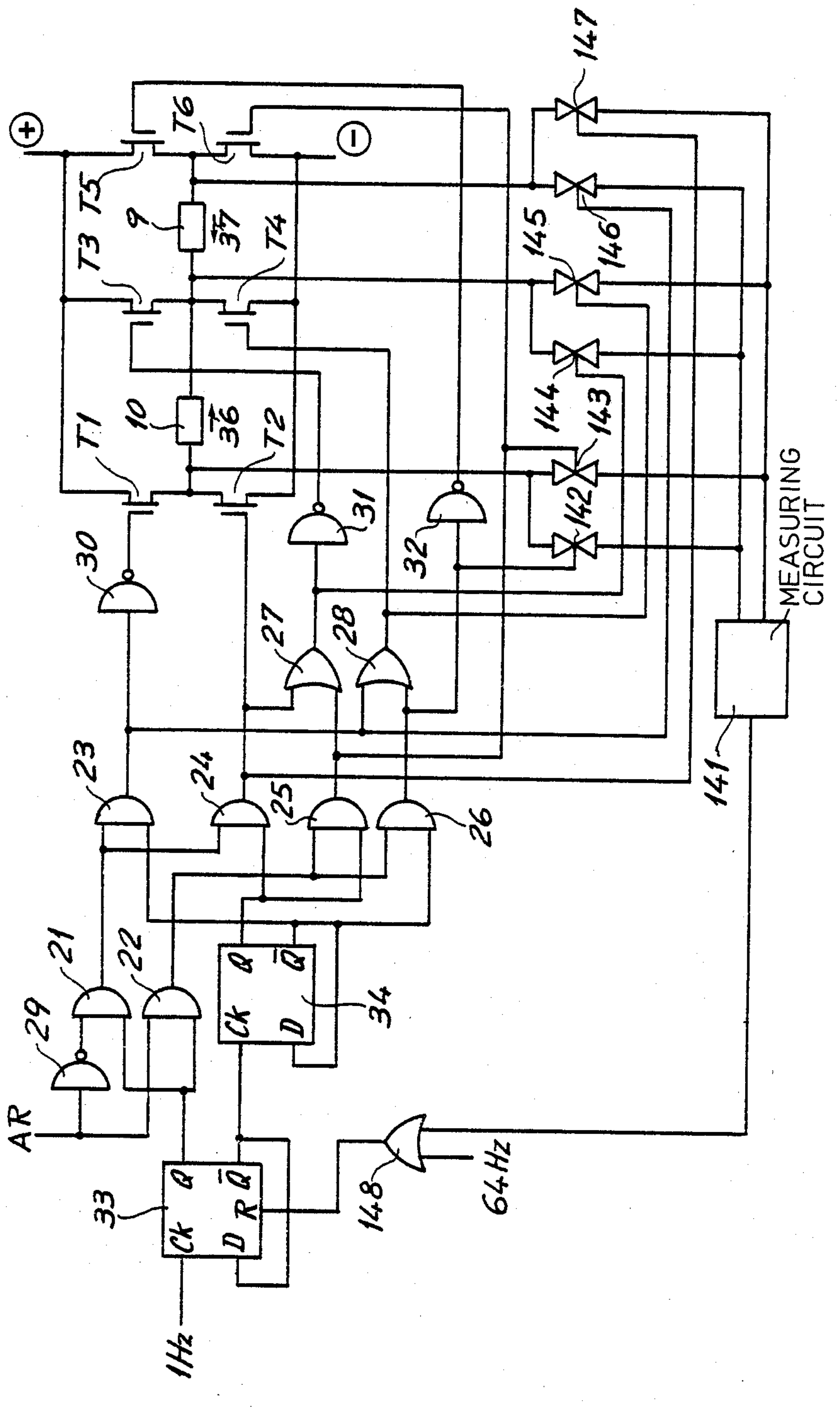
FIG. 17 shows the circuit diagram of an embodiment of a circuit for controlling the duration of the drive pulses in dependence on the mechanical load driven by the motor.

FIG. 17 shows an embodiment of a circuit for performing that adjustment process, applied to the embodiment shown in FIG. 5.

All the components described with reference to FIG. 5, except for the frequency divider 35 and the oscillator 36, also appear in FIG. 17, being denoted by the same references.

The circuit shown in FIG. 17 comprises a measuring circuit 141 which may be of any type and which will not be described in detail herein. The circuit shown in FIG. 17 further comprises six transmission gates 142 to 147 and an OR-gate 148. The output of the gate 148 is connected to the reset input R of the flip-flop 33. One of the inputs of the gate 148 is connected to the output **35*b* of the divider 35 (not shown), while the other of its inputs is connected to the output of the circuit 141. The first terminals of the transmission gates 142 and 143 are jointly connected to the drains of the transistors T1 and T2 and therefore to one of the terminals of the winding 10. The first terminals of the transmission gates 144 and 145 are jointly connected to the drains of the transistors T3 and T4 and therefore to the other terminal of the winding 10 and to one of the terminals of the winding 9. The first terminals of the transmission gates 146 and 147 are jointly connected to the drains of the transistors T5 and T6, and therefore to the other terminal of the winding 9. The second terminals of the gates 142, 144 and 146 are jointly connected to one of the inputs of the measuring circuit 141 and the second terminals of the gates 143, 145 and 147 are jointly connected to the other input of the measuring circuit 141**.

The control electrodes of the transmission gates 142 to 147 are respectively connected to the outputs of the gates 26, 25, 27, 28, 23 and 24. In this way, when a positive current flows in the winding 10, the transmission gates 145 and 146 are in a conducting condition and the measuring circuit 141 is connected to the terminals of the winding 9. When a negative current flows in the winding 10, the transmission gates 144 and 147 are in a conducting condition and the measuring circuit 141 is also connected to the terminals of the winding 9, but in the opposite direction to the previous direction. The polarity of the signal applied to the inputs of the circuit 141 is therefore the same in both cases.

When a positive current flows in the winding 9, the transmission gates 142 and 145 are in a conducting condition, and it is the winding 10 which is connected to the inputs of the circuit 141. When a negative current flows in the winding 9, the transmission gates 143 and 144 are in a conducting condition and the winding 10 is also connected to the inputs of the circuit 141, in the opposite direction to the preceding direction. The polarity of the signal applied to those inputs is therefore the same in both those situations.

Irrespective of which winding has a current flowing therethrough, the output of the circuit 114 produces a signal "1" when for example the voltage applied to its inputs exceeds a given value. That signal "1" switches the output Q of the flip-flop 33 back to "0", thereby interrupting the flow of current in the winding being used.

If, for one reason or another, the output of the circuit 141 does not go to state "1", the output Q of the flip-flop 33 is nonetheless switched back to state "0" by the signal from the output **35*b* of the divider 35, as in the case illustrated in FIG. 5. That arrangement ensures that the flip-flop 33** does not remain indefinitely switched on, so that current does not flow continuously in one of the windings.

It would be possible to provide other circuits, in particular a circuit in which the voltage induced in the winding which does not carry the current would not be measured during each pulse, but at longer intervals of time. That measurement would be used to determine a pulse duration which would then be memorized and used for subsequent pulses.

The circuit 141 could be constructed in the form of a circuit for detecting solely rotation or non-rotation of the rotor. The current pulses would normally all be of the same duration. When the circuit 141 would detect that the rotor has not rotated in response to one of the normal pulses, a catch-up pulse, of longer duration than the normal duration, would then be applied to the motor by its control circuit.

It will be apparent that the same kind of circuit could be readily adapted to the embodiments shown in FIGS. 8 and 11.

What is claimed is:

1. A method for controlling a bi-directional stepping motor including a stator comprising an armature which has first, second and third pole faces defining therebetween a substantially cylindrical space and further comprising first and second magnetic circuits connecting the first pole face to the second pole face and the first pole face respectively, to the third pole face, the stator further comprising first and second windings which are magnetically coupled to the first and second magnetic circuits, respectively, and the motor further including a rotor comprising a permanent magnet mounted rotatably in said space, comprising applying to the first winding first current pulses of alternate directions to cause the rotor to rotate in a first direction, and applying to the second winding second current pulses of alternate directions to cause the rotor to rotate in a second direction, no current being applied to the second winding during the first pulses and no current being applied to the first winding during the second pulses.

2. The method of claim 1 further comprising applying to the second winding, after each first pulse, a third current pulse of the same direction as the immediately preceding first pulse, and applying to the first winding, after each second pulse, a fourth current pulse of the same direction as the immediately preceding second pulse.

3. The method of claim 1 further comprising applying to the second winding, after each first pulse, a third current pulse of the opposite direction to the direction of the immediately preceding first pulse, and applying to the first winding, after each second pulse, a fourth current pulse of the opposite direction to the direction of the immediately preceding second pulse.

4. The method of claim 3 further comprising applying to the first winding, after the beginning of each third pulse, a fifth pulse of the opposite direction to the direction of the immediately preceding first pulse, and applying to the second winding, after the beginning of each fourth pulse, a sixth pulse of the opposite direction to the direction of the immediately preceding second pulse.

5. The method of claim 4 further comprising alternately interrupting the third and fifth pulses during the duration of the fifth pulse, and alternately interrupting the fourth and the sixth pulses during the duration of the sixth pulse.

6. The method of claim 1 further comprising measuring, at least during a pulse applied to one of the windings, the voltage induced in the other winding, and adjusting the duration of said pulses in response to the measured induced voltage.

7. The method of claim 2 further comprising measuring, at least during a pulse applied to one of the windings, the voltage induced in the other winding, and adjusting the duration of said pulses in response to the measured induced voltage.

8. The method of claim 3 further comprising measuring, at least during a pulse applied to one of the windings, the voltage induced in the other winding, and adjusting the duration of said pulses in response to the measured induced voltage.

9. A device for controlling a bidirectional stepping motor including a stator comprising an armature which has first, second and third pole faces defining therebetween a substantially cylindrical space and further comprising first and second magnetic circuits respectively connecting the first pole face to the second pole face and the first pole face to the third pole face, the stator further comprising first and second windings which are magnetically coupled to the first and second magnetic circuits respectively, and the motor further including a rotor comprising a permanent magnet mounted rotatably in said space, said device comprising means for supplying a signal having a first state and a second state for determining the direction of rotation of the rotor, means for supplying a control signal whenever the rotor is to rotate by one step, and control means responsive to the control signal for supplying at least one first current pulse exclusively to the first winding, in a first direction and in the second direction alternately, when the signal for determining the direction of rotation is in its first state, and for supplying at least one pulse exclusively to the second winding, in the first direction and in the second direction alternately, when the signal for determining the direction of rotation is in its second state.

10. The device of claim 9 wherein the control means comprise means responsive to the control signal for supplying a third current pulse to the second winding after each first pulse and a fourth current pulse to the first winding after each second pulse, the third and fourth current pulses being of the same direction as the immediately preceding first and second pulses respectively.

11. The device of claim 9 wherein the control means comprise means responsive to the control signal for supplying a third current pulse to the second winding after each first pulse and a fourth current pulse to the first winding after each second pulse, the third and fourth current pulses being of the opposite direction to the direction of the immediately preceding first and second pulses respectively.

12. The device of claim 11 wherein the control means comprise means responsive to the control signal for supplying a fifth current pulse to the first winding after the beginning of each third pulse and a sixth current pulse to the second winding after the beginning of each fourth pulse, the fifth and sixth current pulses being of the opposite direction to the direction of the immediately preceding first and second pulses respectively.

13. The device of claim 12 further comprising means for alternately interrupting the third and fifth pulses during the fifth pulse and for alternately interrupting the fourth and sixth pulses during the sixth pulse.

14. The device of claim 9 further comprising means for measuring, at least during a pulse supplied to a winding, the voltage induced in the other winding, means for selectively connecting the measuring means to said other winding in response to the signal for determining the direction of rotation and the control signal, and means for adjusting the duration of the pulses in response to the measured induced voltage.

15. The device of claim 10 further comprising means for measuring, at least during a pulse supplied to a winding, the voltage induced in the other winding, means for selectively connecting the measuring means to said other winding in response to the signal for determining the direction of rotation and the control signal, and means for adjusting the duration of the pulses in response to the measured induced voltage.

16. The device of claim 11 further comprising means for mesuring, at least during a pulse supplied to a winding, the voltage induced in the other winding, means for selectively connecting the measuring means to said other winding in response to the signal for determining the direction of rotation and the control signal, and means for adjusting the duration of the pulses in response to the measured induced voltage.

* * * * *

UNITED STATES PATENT AND TRADEMARK OFFICE
CERTIFICATE OF CORRECTION

PATENT NO. : 4,514,676

DATED : April 30, 1985

INVENTOR(S) : Grandjean et al

It is certified that error appears in the above-identified patent and that said Letters Patent are hereby corrected as shown below:

In claim 1, column 16, line 51, delete the word "respectively"; after the word "face"(second occurrence) insert the word --respectively--.

Signed and Sealed this

*Twenty-fourth* Day of *December 1985*

[SEAL]

*Attest:*

DONALD J. QUIGG

*Attesting Officer* *Commissioner of Patents and Trademarks*